Patented May 22, 1951

2,553,601

UNITED STATES PATENT OFFICE 2,553,601

WATER-SOLUBLE LUBRICANT OF POLYETHYLENE GLYCOL AND A SULFONATE

Franklin Veatch and John G. Partch, Cleveland, Ohio, assignors to The Standard Oil Company, Cleveland, Ohio, a corporation of Ohio No Drawing. Application November 25, 1947, Serial No. 788,080

7 Claims. (Cl. 252—49.3)

The present invention relates to a composition of matter comprising a polyethylene glycol and a surface active sulfonate that can readily be dissolved in water to form a superior machining lubricant.

It has already been proposed to use aqueous machining lubricants as metal working fluids in the form of oil emulsions in water. In such emulsions, the oil contributes lubricity and possibly some anti-rust characteristics, the water contributes a high heat absorbing capacity to effectively cool the work and the tool and the emulsifying agent renders the emulsion stable and often contributes to the anti-rust properties of the emulsion. Oils of this type are known in the trade as "soluble oils" and are self-emulsifying, i. e., when put in water, they form a permanent emulsion upon merely mixing.

Oil emulsions of this type have been used extensively and with considerable success in the industry but have a number of important disadvantages. One of these is that the lubricity is much lower than that of oil type cutting fluids due to the fact that only a small amount of oil is contained in the emulsion. If the proportion of oil in the emulsion is increased to obtain great lubricity, then the ability of the emulsion to carry away the heat generated by the machining operation is decreased. Furthermore, the cost is increased so as to approach that of a cutting oil. Another disadvantage is that most emulsions are quite thick, milky in appearance, and relatively opaque with the result that the operator of a lathe, for example, is unable to observe the cutting operation as well as he should. Finally they leave much to be desired in their chip wetting ability, i. e., their capacity to permit the metal chips to settle and separate rapidly. Because of the high viscosity of such emulsions, the metal chips settle slowly and this interferes with recirculation of the emulsion.

The composition of the present invention is one that can be dissolved or dispersed rather than emulsified with water and is, therefore, of satisfactory transparency. The essential components of this composition of matter are a polyethylene glycol having an average molecular weight of about 2000 and 8000, resembling a natural wax in appearance and texture, and a suitable water-soluble surface active sulfonate such as a sulfonated mineral oil.

The preferred polyethylene glycols are available on the market under the trade name "Carbowax" 4000 and 6000. Any suitable water-soluble surface active sulfonate may be used in the composition of this invention. The compounds should contain the hydrophillic $\cdot SO_3H$ or $\cdot SO_3Na$ group and this may be linked to carbon or through oxygen as $\cdot O \cdot SO_3H$ or $\cdot O \cdot SO_3Na$, or the Na may be any alkali metal or other monovalent positive radical such as $-NH_4$, $-K$, etc. The compound also contains any hydrophobic group comprising 8 or more carbon atoms. Any linkage is possible such as alkyl (8 or more C) sulfates, taurides, sulfonated mineral and vegetable oils which contain the higher hydrophobic group and the sulfonic group. A sulfonated mineral oil, which is the most readily available and economic and is available under the trade name "Penola 2210," has been found to be eminently suitable. In addition to its synergistic action with the polyethylene glycol in the cutting and settling action, the surface active sulfonate contributes anti-rust properties to the solution.

The range of relative proportions of the polyethylene glycol to the sulfonate may vary widely depending upon the particular property desired in the composition, and is not critical as long as it is present in an appreciable quantity. It has been found that relative proportions of from about 2 to about 100 parts by weight of polyethylene glycol to 1 part by weight of sulfonate forms a composition that is particularly effective as a machining lubricant when dissolved in water.

The results obtained by combining the polyethylene glycols and the sulfonate are quite surprising as will appear in more detail in the example that follows, in view of the fact that the composition, when dissolved in water, is far more effective in its chip wetting and settling capacity than would be suggested by either of the components when dissolved individually in water.

In use, the composition of this invention is dissolved in water so as to form a solution containing from about 2 to about 11% of the composition.

The solution thus formed is stable and transparent, has a high degree of lubricity, a high capacity for removing the heat generated by a machining operation and an unexpectedly remarkable ability to wet and settle the chips of metal produced thereby.

Without intending in any way to limit the scope of the present invention, the following specific example is included to supplement the disclosure herein.

EXAMPLE

A composition comprising 4 parts by weight of polyethylene glycol having an average molecular weight of 4000 and 0.5 part by weight of sulfonated mineral oil was made into an aqueous machining lubricant by dissolving in 9.5 parts by weight of water. The capacity of this solution, referred to hereinafter as "cutting solution," for settling metal chips was compared with that of a well-known emulsion made with a conventional "soluble oil" and used for the machining of metals by subjecting each of these fluids to a conventional swatch test. The well-known emulsion consisted of 95 parts by weight of water emulsified with 5 parts by weight of a commercial soluble oil consisting of 84% by weight of a straw oil having a viscosity SUS of 75 at 100° F. and 16% sulfonated mineral oil. This emulsion will be referred to hereinafter as "emulsion." The cutting solution was also compared with water alone, with water containing only 0.5% of sulfonated mineral oil and with water containing only 4% of the same polyethylene glycol. This test, which is commonly employed in evaluating the chip wetting properties of a fluid, is a measure of the time required for a small canvas swatch to sink in a sample of the particular fluid. The less time required, the greater is the chip wetting property of the fluid. The results of the comparative tests are tabulated below:

Table 1

| Fluid | Average swatch sinking time |
|---|---|
| Emulsion | 50.8 seconds. |
| Cutting Solution | 44 seconds. |
| 0.5% Sulfonated Mineral Oil in Water | 70 seconds. |
| 4% Polyethylene Glycol (Mol. Wt. 4000) in Water. | greater than 20 hours. |
| Water Alone | greater than 1 hour. |

It will be noted from the results tabulated in the foregoing table that the combination of polyethylene glycol and sulfonated mineral oil in water has a far more effective chip wetting ability than would be expected on the basis of tests carried out with either of the components dissolved separately in water and is superior to that of a 5% emulsion of a widely used soluble oil as a cutting fluid.

The cutting ability of another solution prepared in accordance with the present invention was compared on a milling machine with standard emulsions. In each test the speed of the cutting tool was 985 R. P. M., the depth and width of the cut were 0.200 and 0.250 inch, respectively, the table feed was 1⅞ inches, the duration of the test was one minute, the volume of fluid used in each test was approximately 100 cc. and the metal machined in each test was a 1020 steel. The force required by the cutting tool to cut through the metal was measured in each instance and compared with that applied by using a standard commercial cutting oil consisting of 80 parts of a paraffin oil (with 1½% sulfur) having a viscosity SUS of 100–150 at 100° F. and 20 parts lard oil. The comparative tests listed in the table below were carried out with a 10% emulsion of the same commercial soluble oil and listed as "emulsion" and a "cutting solution" made in accordance with the invention comprising 8% polyethylene glycol having an average molecular weight of 6000 and 0.5% sulfonated mineral oil in water. The results were as follows:

Table 2

| Cutting fluid: | Relative force |
|---|---|
| Standard cutting oil | 100 |
| Emulsion | 125 |
| Water | 150 |
| Cutting solution | 94 |

The results of these tests show that the aqueous solutions formed by dissolving or dispersing the composition of this invention in water have cutting properties comparable with one of the best cutting oils now on the market and superior to that of a 10% emulsion of a soluble oil with water.

It is to be understood that other surface active water-soluble sulfonates may be used to replace the sulfonated mineral oil with similar results.

It is also to be understood that the composition "comprises" the polyethylene glycol and the surface active sulfonate and to this may be added any other ingredient that does not interfere with the cutting action, such as viscosity modifiers, antioxidants, coloring matter and inert diluents such as graphite, as long as the composition comprises the polyethylene glycol and sulfonate as the major components to yield an improved cutting fluid.

The expression "consisting essentially of" as used hereinafter is intended to render the claims open, i. e., as including, only unspecified ingredients which do not materially effect the basic and novel characteristics of the composition.

It is to be understood that innumerable variations and modifications will immediately become apparent to those skilled in the art upon reading the foregoing disclosure. The invention contemplates all such variations and modifications as come within the scope of the appended claims.

We claim:

1. A water-soluble composition consisting essentially of about one part by weight of a water-soluble surface active sulfonate and an amount within the range of about 2 to about 100 parts by weight of a polyethylene glycol having an average molecular weight within the range of from about 2000 to about 8000 to form a composition which is adapted to be added to water to provide an improved metal cutting fluid.

2. The composition of claim 1 in which the water-soluble surface active sulfonate is a sulfonated mineral oil.

3. The composition of claim 2 in which the amount of the polyethylene glycol in about 8 parts by weight and its average molecular weight is about 4000.

4. An aqueous composition consisting essentially of water, an amount within the range of about 2 to about 10% by weight of a polyethylene glycol having an average molecular weight within the range from about 2000 to 8000, and an amount within the range of about 0.1 to 5% of a water-soluble surface active sulfonate to provide an improved metal cutting fluid.

5. The composition of claim 2 in which the surface active sulfonate is a sulfonated mineral oil.

6. The composition of claim 5 in which the polyethylene glycol has an average molecular weight of about 4000.

7. The composition of claim 6 in which the ingredients have the following proportions in parts by weight:

| | |
|---|---|
| Water | 9.5 |
| Polyethylene glycol 4000 | 4.0 |
| Sulfonated mineral oil | 0.5 |

FRANKLIN VEATCH.
JOHN G. PARTCH.

REFERENCES CITED

The following references are of record in the file of this patent:

UNITED STATES PATENTS

| Number | Name | Date |
|---|---|---|
| 2,265,799 | Carlson et al. | Dec. 9, 1941 |
| 2,338,522 | Liberthson | Jan. 4, 1944 |
| 2,355,995 | Morgan | Aug. 15, 1944 |
| 2,420,328 | Shipp | May 13, 1947 |
| 2,425,845 | Toussaint | Aug. 19, 1947 |

OTHER REFERENCES

"Synthetic Organic Chemicals," Carbide and Carbon Chemical Corp., 12th edition, July 1, 1945, page 23.